H. A. VALLEZ.
NON-CAKING FILTER PRESS.
APPLICATION FILED FEB. 24, 1914.
1,227,982.
Patented May 29, 1917.
5 SHEETS—SHEET 1.
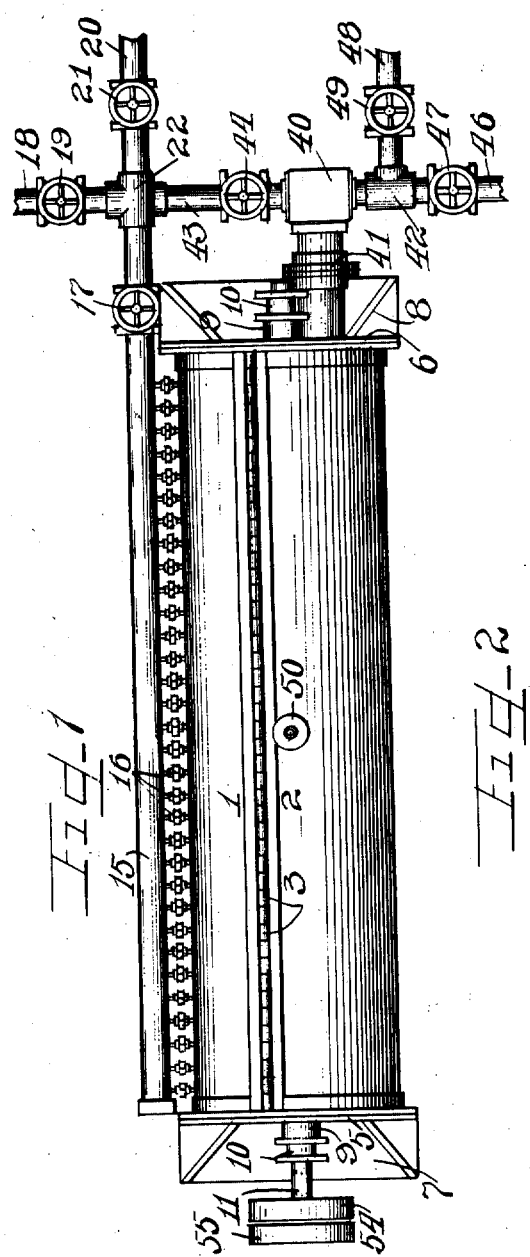
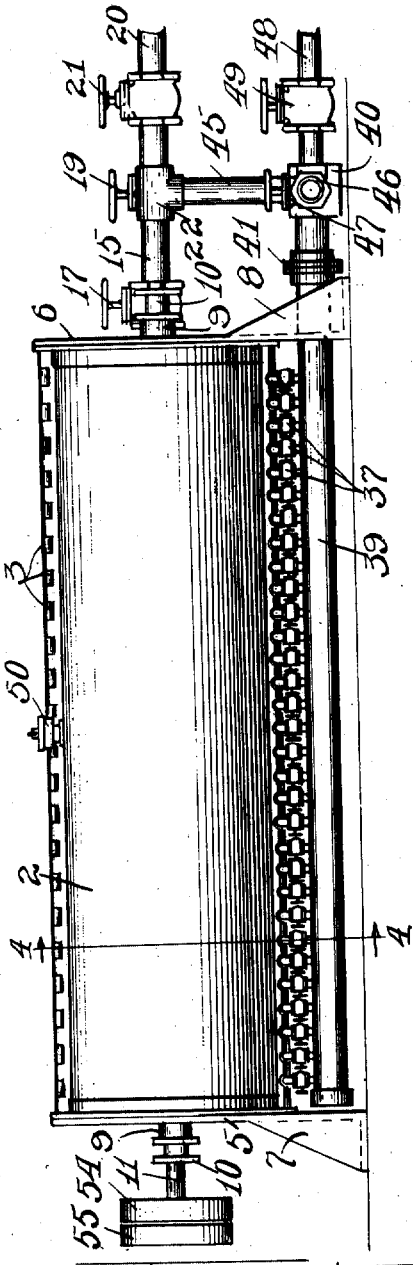

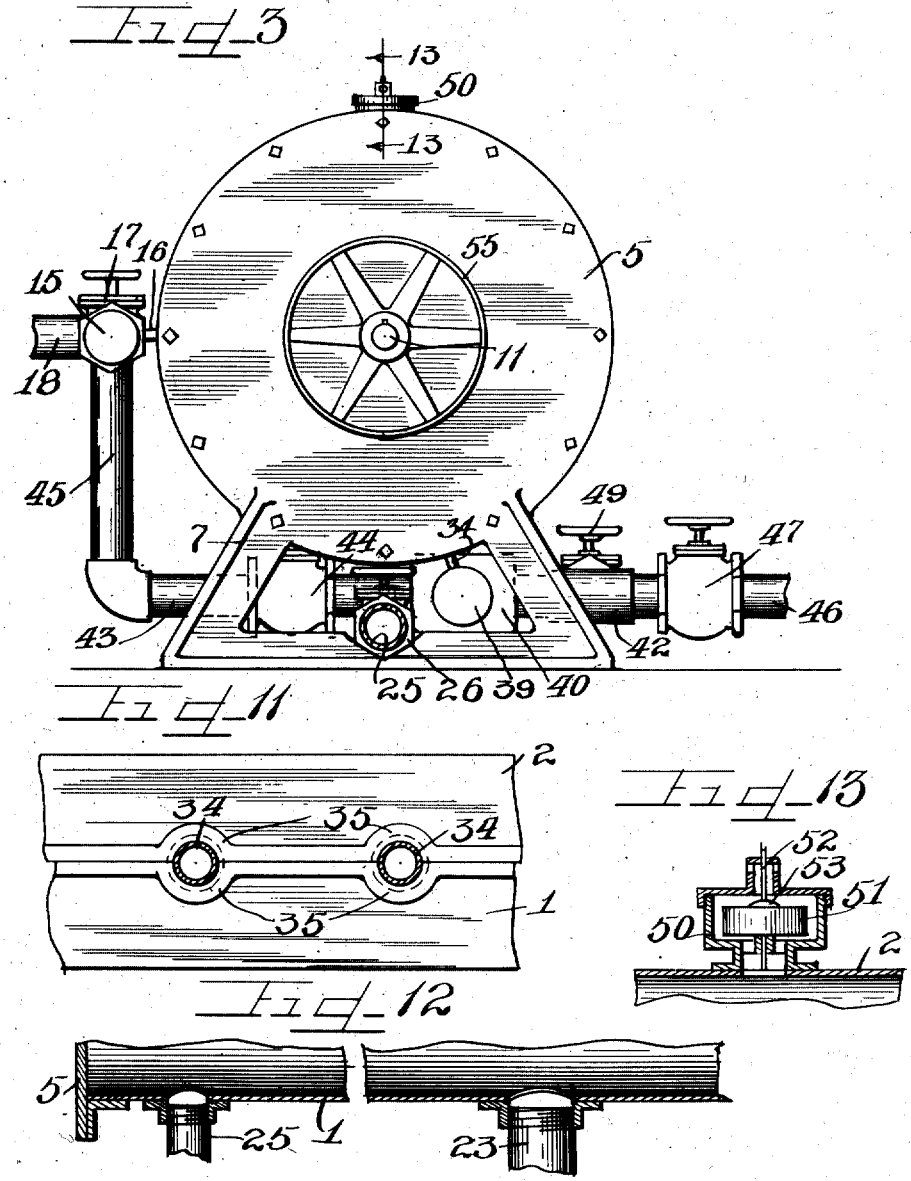

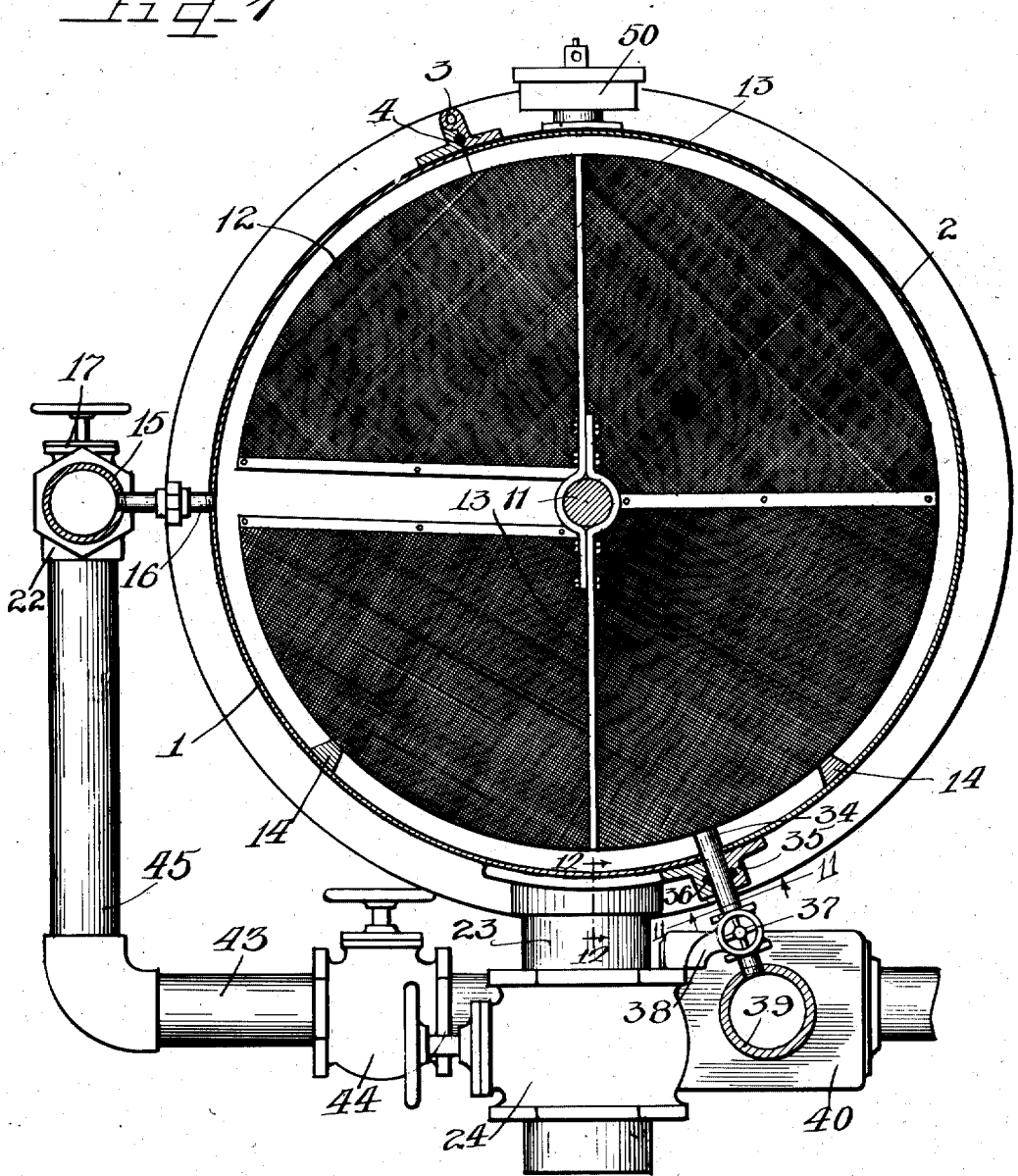

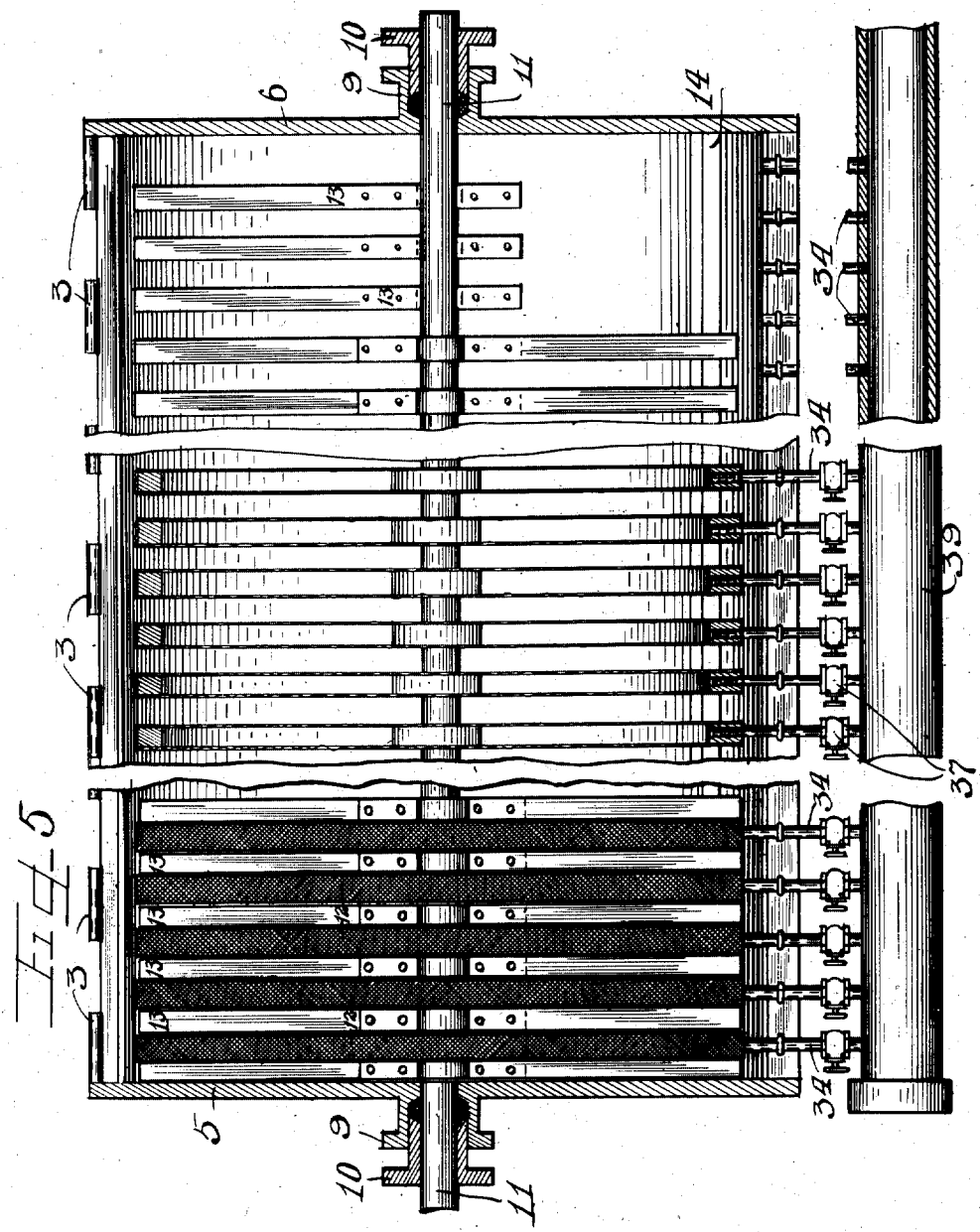

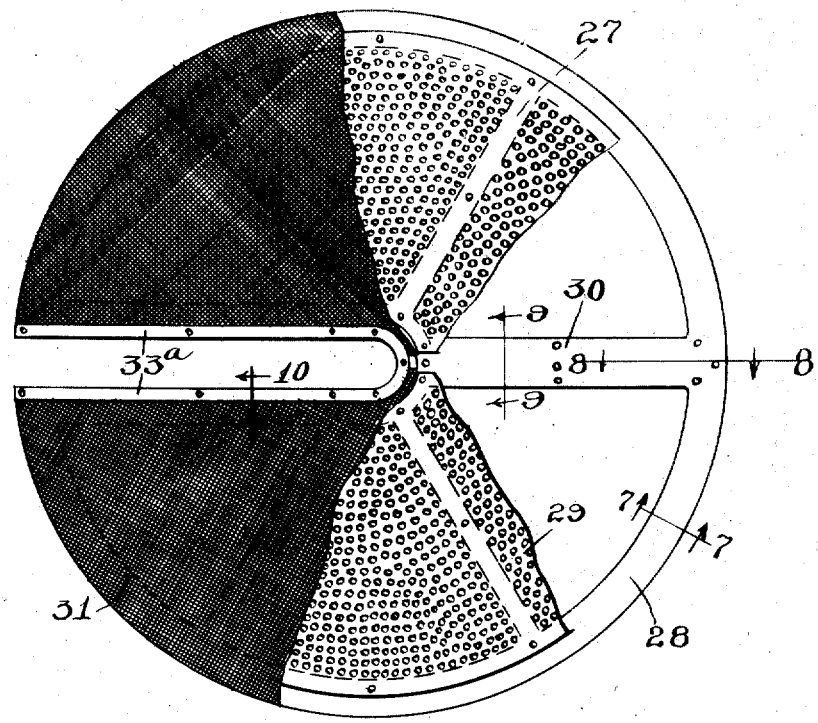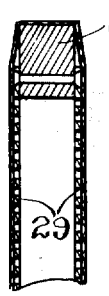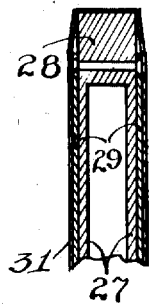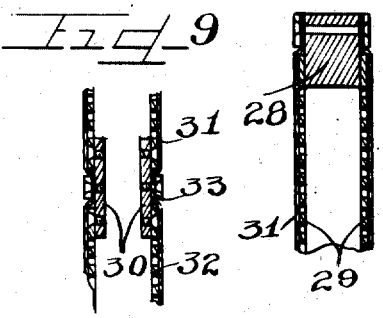

UNITED STATES PATENT OFFICE.

HENRY A. VALLEZ, OF BAY CITY, MICHIGAN.

NON-CAKING FILTER-PRESS.

1,227,982.　　　　Specification of Letters Patent.　　Patented May 29, 1917.

Application filed February 24, 1914. Serial No. 820,526.

*To all whom it may concern:*

Be it known that I, HENRY A. VALLEZ, a citizen of the United States, and a resident of Bay City, in the county of Bay and State of Michigan, have invented certain new and useful Improvements in Non-Caking Filter-Presses; and I do hereby declare that the following is a full, clear, and exact description of the same, reference being had to the accompanying drawings, and to the numerals of reference marked thereon, which form a part of this specification.

In most types of filter presses a common disadvantage to be taken into account both in the design of the press, as well as in the operation thereof, is the formation of a cake, due to the deposit of the precipitate upon the filtering elements. The formation of this cake with an increase in density and thickness thereof, not only tends to retard the filtration through the filter elements, but also necessitates a loss of time and inconvenience in removing the cake from the press, as well as requiring the expert services of an operator to watch the press during a filtering operation and prevent the formation of the cake beyond certain limits.

This invention has for its object the construction of a filter press wherein positively actuated mechanisms are provided to continually churn the contents of the press and prevent the permanent deposit of the precipitate on the filtering elements, maintaining the residue in the form of a slush or mud, and keeping the surfaces of the filtering elements free at all times.

This invention relates to that type of filter press in which the filtering elements are stationary. The press is so designed as to permit ready removal of the filtering elements for repair without an undue loss of time or inconvenience to the operator. For this purpose the casing is constructed of two sections hingedly connected to one another, permitting one section to be swung open, giving access to the entire interior of the press and permitting ready removal of any one or all of the filtering elements therefrom.

It is an object of this invention to construct a filter press wherein a plurality of filtering elements are mounted adjacent one another in vertical position and having power driven agitating and scraping means rotating between the filtering elements to stir the contents of the press and clean the surface of the filter elements.

It is also an object of this invention to provide a construction wherein individual piping connections are provided for each filtering element leading to a common discharge manifold, so that in the event of accident to one or more individual filtering elements the communication therebetween and the discharge manifold may be cut off and the operation completed with the other filtering elements.

It is also an object of this invention to construct a filter press wherein means are provided for introducing steam, air or water through a multitude of inlets to direct the flow of the fluid between the filtering elements to thoroughly wash the same of the adhering material thereon and introduce into the filter press different fluids for the different purposes desired.

It is a further object of this invention to construct a filter press wherein suitable pipe connections are provided for introducing the juice to be filtered at one end of the device near the bottom thereof and with a plurality of jets capable of admitting other fluids for certain purposes between adjacent filtering elements at an elevated position in the casing.

It is also an object of this invention to construct a filter press embracing circular filtering elements covered with a fabric and radially slotted to permit insertion of the elements into the press over a central axial shaft which supports and drives the agitating mechanism operating between adjacent filters.

It is also an object of this invention to construct a filter press embodying filters of novel construction having a discharge outlet for each filter communicating in the bottom thereof and controlled by a three-way valve to cut off or open communication between the same and a manifold discharge pipe or direct a flow through a small spigot for testing.

It is furthermore an object of this invention to construct a filter press provided with power driven means to agitate and stir the contents of the press and maintain the surfaces of the filtering elements clear to prevent the formation of a cake thereon, and with means for washing the precipitated contents to obtain the sugar from the residue and finally discharging the washed precipitate through a centrally disposed discharge in the bottom of the press.

It is finally an object of this invention to construct a filter press easily operated and operating efficiently to perform the purpose, and provided with piping connections to permit a flow of fluid to be passed through the device in either direction through the filtering elements to thoroughly clean the same conjointly with the action of scraping mechanisms for the purpose.

The invention (in a preferred form), is illustrated in the drawings and hereinafter more fully described.

On the drawings:

Figure 1 is a top plan view of a device embodying the principles of my invention.

Fig. 2 is a side elevation thereof.

Fig. 3 is an end elevation at the driving end of the filter press.

Fig. 4 is a vertical transverse section taken on line 4—4 of Fig. 2.

Fig. 5 is a longitudinal vertical section taken through the filter press slightly broken away and with parts shown in section and in elevation to illustrate the connection and assembly of the elements.

Fig. 6 is an elevation partly broken away of one of the filtering elements, showing the construction thereof.

Fig. 7 is a fragmentary section on line 7—7 of Fig. 6.

Fig. 8 is a fragmentary section on line 8—8 of Fig. 6.

Fig. 9 is a fragmentary section on line 9—9 of Fig. 6.

Fig. 10 is a fragmentary section on line 10—10 of Fig. 6.

Fig. 11 is a fragmentary section on line 11—11 of Fig. 4.

Fig. 12 is a fragmentary section of the lower portion of the entire drum taken on line 12—12 of Fig. 4 and broken away, showing the position of the inlet and outlet pipes in the drum.

Fig. 13 is a fragmentary detail section of the vent valve taken on line 13—13 of Fig. 3.

As shown in the drawings:

The filter press comprises a drum consisting of two sections of semi-cylindrical shape, the one a stationary section denoted by the reference numeral 1, and the other by the numeral 2, and connected to said section 1, by means of hinges 3, along the upper side of the drum. Said hinge members are recessed and provided with a gasket 4, to form a seal at the joints of the sections when in closed position. Said drum is closed and supported by end members 5 and 6, respectively, each of which has formed integral therewith a supporting base denoted respectively by the reference numerals 7 and 8. Each of said head members 5 and 6, have formed integrally and centrally thereon a bearing gland member 9, which coöperates with an adjustable gland member 10, to receive a driving shaft 11, axially through the drum, supporting the shaft rotatably and in sealing relation therein.

The filtering elements denoted as a whole by the reference numeral 12, are provided with a relatively large radial slot permitting the filtering elements to be placed over said shaft 11, into a concentric relation with the casing or drum, and rigidly secured on said shaft and spaced therealong to rotate between adjacent filtering elements, are scraping or agitating bars or arms 13.

Secured within the lower half of the drum, one on each of the respective sections 1 and 2, are supporting ribs 14, which receive the filtering elements 12, thereon, and together with said shaft 11, serve to hold the same in position. An inlet manifold or header 15, extends horizontally along the exterior of the drum at one side thereof, and communicates through a number of small pipes 16, through said drum section 1, to introduce water, steam or air, as desired, into the drum between the adjacent filtering elements 12. The flow through said manifold 15, is controlled by a suitable valve 17, and said manifold receives its supply of fluid from either the water pipe 18, having a valve 19, or the steam or air pipe 20, having a valve 21, which communicates in a right angled cross 22, which also receives the end of said manifold 15, therein.

A centrally disposed outlet pipe 23, is provided in the bottom of the drum communicating in said drum section 1, and is provided with a suitable valve 24, to open or close the same as desired. A valved inlet pipe 25, communicates in the drum at one end thereof in the bottom of said section 1, and the flow therethrough is governed by a valve 26. Each of said filtering elements comprises a spider having hollow arms 27, as clearly shown in Fig. 8, and a rim 28, and with perforated metallic plates 29, secured on each side of said spider to said arms and rim respectively by screws or bolts for the purpose.

A hollow arm 30, slightly larger than the arm 27, is alined on a radius on the same diameter with the slot before mentioned in the filtering elements, and the purpose of said arm is to permit attachment thereto of the margins of semicircular filter cloth bags 31 and 32, respectively, by means of bars 33, rigidly secured to said arm by means of screws. U-shaped clamping bars 33ª, are also provided for attaching the respective filter cloth bags at their terminating edges along the radial slot in the filter element.

Threaded into the lower end of each of the filtering elements through the rim 28, thereof, is an eduction filtrate pipe 34, and these extend downwardly from said filter elements and outwardly through complementary bosses 35, secured along the meeting surfaces of the respective drum sections 1 and 2, having recesses therein to receive gaskets 36, surrounding the eduction pipes and preventing leakage. A three-way valve 37, is mounted in said pipe 34, and is provided with a spigot 38, to permit a test sample of the fluid to be taken from time to time, and the outer end of said eduction pipe 34, is secured by means of a suitable pipe connection into a common discharge manifold 39, for the filtrate.

It is thus readily apparent that the upper section 2, may be swung open about its hinges 3, without interfering in any way with the eduction pipes 34, and if it is desired to remove a filtering element from the press for repair or replacement of the fabric, said eduction pipe is first disconnected from the manifold or unthreaded from the filtering element, whichever is most convenient for the purpose.

A juice-chest 40, is positioned at one end of the filter press and is connected to said manifold 39, by means of a pipe joint 41, and is also provided with two other passages, one of which has a T 42, connected thereto, and the other of which receives a pipe 43, provided with a valve 44. Said pipe 43, communicates with an upwardly directed pipe 45, which is threaded into the downwardly directed branch of the cross 22. A pipe 46, communicates with one of the branches of said T 42, and is provided with a valve 47, to control the flow of the filtrate from the press, and another pipe 48, also communicates in said T 42, and is provided with a valve 49, to receive the sweet water from the press after the washing operation of the precipitate. A float controlled vent valve is mounted in the top of the drum upon the section 2, and consists of a casing 50, having a float 51, therein, mounted upon a stem 52, with a valve closure 53, which, when the float is elevated serves to close against the upper outlet passage in said casing to close the same.

In order to rotate or permit the agitating or scraping elements 13, to remain at rest within the drum, tight and loose pulleys, denoted respectively by the reference numerals 54 and 55, are mounted upon the outer end of said shaft 11, to receive a belt thereabout from any suitable source of power.

The operation is as follows:

When the press is empty all the valves are closed with the exception of the inlet valve 26, for the juice, and the outlet valve 47, and the juice is then admitted into the press under pressure. When the level of the juice rises within the drum the float valve in the top thereof is closed immediately following the expulsion of air from the drum. The shaft 11, is then rotated and the contents of the press are churned and stirred by the agitating arms 13, which at the same time serve to clear the surfaces of the filtering elements from adhering precipitated matter, and the filtrate from each of the filtering elements enters the discharge manifold 39, through the respective eduction pipes 34, provided for the purpose. In the event of accident to any one of the filtering elements the three-way valves 37, may be successively actuated and a sample taken to determine which is the defective filter, and that element may then be cut out of operation by closing the valve 37, and preventing a flow into said discharge manifold 39.

When the precipitated matter within the press becomes so dense as to hinder the filtering operation the inlet valve 26, is closed and a charge of water is admitted to the manifold header 15, and sufficient water is at this time admitted to thoroughly wash the mud within the press to dissolve out the remaining traces of sugar. The valve 47, is closed and the valve 49, opened to permit the "sweet water" to flow off to suitable containers for the purpose. The press is then flushed with water by closing all the valves with the exception of valves 17 and 19, and discharge valve 24, so that the residue is entirely removed from the press, the agitating arms 13, greatly assisting in the operation. A reverse flow may be maintained through the filtering elements to insure a thorough cleansing thereof by closing the valve 17, and opening the valves 37 and 44, permitting the water to flow into the press through the manifold 39, admitting water into each of the filtering elements through the eduction pipes 34, and of course this wash water is discharged through the pipe 23, in the bottom of the press. By suitably manipulating the valves steam or air under pressure, as desired, may be admitted into the manifold header 15, either for forcing the sweet water from the press or assisting the filtration operation prior to the admission of sweet water into the device.

I am aware that various details of construction may be varied through a wide range without departing from the principles of this invention. I therefore do not purpose limiting the patent granted otherwise than necessitated by the prior art.

I claim as my invention:

1. In a device of the class described a casing, an axial member therein, a plurality of filtering elements slotted to engage upon said member, agitating means movable between each of said filtering elements to stir the contents of the press and clean the surface of said elements, and means maintaining said filter elements stationary during the movement of said agitating means.

2. In a filter press a plurality of stationary slotted filter elements, the slots permitting independent insertion and removal of any one of said elements into and from said filter press, and a plurality of rotatable agitating arms movable therebetween to stir the contents of the press and clean the surface of said filtering elements.

3. In a device of the class described a casing comprising hinged sections, a drive shaft extending co-axially through said casing, supporting means on the side walls of said casing, a plurality of filter elements resting on said supporting means and constructed for engagement with said drive shaft for support thereby to permit removal of any one of said filter elements independently of the others when said hinged casing is opened, agitating arms secured on said drive shaft sweeping between adjacent filter elements to clean the same and stir the contents of the casing, and means drawing off the filtrate from each of said filter elements.

4. In a device of the class described a casing, a plurality of stationary filtering elements therein, each having a radial opening therethrough to permit independent removal of each from said casing, agitating arms moving over the surface thereof to prevent the formation of a cake thereon, and an individual eduction pipe for each of said filtering elements.

5. In a device of the class described a casing, means on the inner walls thereof forming supports thereon, filter elements within said casing supported on said means, a centrally disposed shaft within said casing and journaled to rotate therein, each of said filtering elements constructed to engage over said shaft, and cleaning and agitating mechanisms mounted on said shaft adapted to rotate between adjacent filtering elements.

6. In a device of the class described a casing, a plurality of independently removable stationary filtering elements therein, rotatable agitating elements sweeping thereover to maintain the same clear of precipitated matter, and eduction pipes communicating through the casing for each of said filtering elements.

7. In a device of the class described a casing, a shaft extending axially therethrough, agitating arms rigidly secured thereon to rotate therewith, filtering elements disposed between each pair of said agitating elements and held stationary within said casing, said filtering elements slotted to permit ready removal thereof from said casing, and an individual valved eduction pipe for each of said filtering elements communicating outwardly through the casing.

8. In a device of the class described a casing, a shaft extending therethrough, agitating arms thereon, a plurality of stationary filtering elements disposed between adjacent pairs of said agitating arms, said filter elements slotted to permit the same to be slipped over said shaft, ribs within said casing to assist in supporting said filtering elements on said shaft, and means withdrawing the filtrate from each of said filtering elements.

9. In a device of the class described an axially supported filter element having a slot therein to permit removal thereof from the device in a plane perpendicular to the axis thereof.

10. In a filter press of the class described a casing, a hinged section forming a part thereof adapted to be opened, and filter elements within said casing, radially slotted to permit insertion into and removal from said casing when the hinged section thereof is opened.

11. A filter press of the class described comprising upper and lower casing sections hingedly connected, a centrally disposed supporting means within said casing, and a plurality of slotted filter elements adapted for engagement over said supporting means and capable of being removed independently of one another from said casing when the hinged section thereof is opened.

In testimony whereof I have hereunto subscribed my name in the presence of two subscribing witnesses.

HENRY A. VALLEZ.

Witnesses:
CHARLES W. HILLS, Jr.,
E. SAINTZ.